United States Patent
Bailey

(10) Patent No.: US 7,740,761 B2
(45) Date of Patent: Jun. 22, 2010

(54) SCREENING APPARATUS

(75) Inventor: Marshall G. Bailey, Aberdeen (GB)

(73) Assignee: Axiom Process Limited (GB)

( * ) Notice: Subject to any disclaimer, the term of this patent is extended or adjusted under 35 U.S.C. 154(b) by 682 days.

(21) Appl. No.: 10/561,331

(22) PCT Filed: Jun. 14, 2004

(86) PCT No.: PCT/GB2004/002544

§ 371 (c)(1),
(2), (4) Date: Dec. 16, 2005

(87) PCT Pub. No.: WO2004/110589

PCT Pub. Date: Dec. 23, 2004

(65) Prior Publication Data

US 2006/0144779 A1   Jul. 6, 2006

(30) Foreign Application Priority Data

Jun. 12, 2003 (GB) .................................. 0313521.7
Dec. 24, 2003 (GB) .................................. 0329920.3

(51) Int. Cl.
*B01D 33/00* (2006.01)
*B01D 35/00* (2006.01)
*B01D 33/03* (2006.01)
*B01D 24/30* (2006.01)
*B07B 1/28* (2006.01)
*B07B 1/32* (2006.01)

(52) U.S. Cl. .................. 210/330; 210/359; 210/384; 210/388; 209/315; 209/316; 209/254; 209/311

(58) Field of Classification Search .................. None
See application file for complete search history.

(56) References Cited

U.S. PATENT DOCUMENTS

| | | | | |
|---|---|---|---|---|
| 2,901,109 | A | * | 8/1959 | Eppenberger ............... 209/316 |
| 2,943,679 | A | | 7/1960 | Scott et al. |
| 3,221,825 | A | | 12/1965 | Henderson |
| 4,116,288 | A | | 9/1978 | Love |
| 4,319,990 | A | * | 3/1982 | Muller ....................... 209/240 |
| 4,322,288 | A | * | 3/1982 | Schmidt ..................... 209/356 |
| 4,446,022 | A | | 5/1984 | Harry et al. |
| 4,576,713 | A | | 3/1986 | Melin |
| 4,940,535 | A | | 7/1990 | Fisher et al. |
| 5,593,582 | A | * | 1/1997 | Roff, Jr. ..................... 210/325 |
| 5,614,094 | A | | 3/1997 | Deister et al. |
| 6,530,482 | B1 | * | 3/2003 | Wiseman .................... 209/253 |

FOREIGN PATENT DOCUMENTS

| | | | |
|---|---|---|---|
| DE | 4210770 | | 10/1993 |
| EP | 1088582 A | | 4/2001 |
| WO | WO 03/013690 | * | 2/2003 |

* cited by examiner

*Primary Examiner*—Krishnan S Menon
*Assistant Examiner*—Benjamin Kurtz
(74) *Attorney, Agent, or Firm*—Gifford, Krass, Sprinkle, Anderson & Citkowski, P.C.

(57) ABSTRACT

The present invention provides a vibratory screening apparatus (1) for use in removing solids from a liquid feed, and a basket (4) therefore. The apparatus comprises a static outer housing (2), and a floating basket vibratable by a vibrator device (10). The basket mounts a stack (7) of screen assemblies (8) provided with respective flow directing trays (9) for receiving filtrates from the screen assemblies. A flow distributor (15) divides the feed into at least first and a second feed streams and directs them onto respective screen assemblies, and receives from the flow directing trays, filtrates from respective screen assemblies.

15 Claims, 6 Drawing Sheets

SCREENING APPARATUS

FIELD OF THE INVENTION

The present invention relates to vibratory screening apparatus suitable for use with drilling fluids, mineral processing, classification, and dewatering, and the like.

BACKGROUND OF THE INVENTION

Vibratory screening apparatus is widely used in the oil drilling industry for removing drill cuttings from drilling fluids, and over the years various improvements have been made to the screens used therein, methods for mounting the screens etc to improve ease of use, reduce maintenance etc. A particular problem in offshore platform oil drilling is, however, that platform real estate is very restricted and extremely expensive. There is accordingly a need to improve the efficiency of vibratory screening apparatus in relation to the physical size thereof.

SUMMARY OF THE INVENTION

The present invention provides a vibratory screening apparatus for use in removing solids from a liquid and solids mixture feed, said apparatus comprising a static outer housing, at least one floating basket mounted so as to be vibratable, in use of the apparatus, by a vibrator device formed and arranged for vibrating said basket, said basket mounting a stack of screen assemblies, with superposed screen assemblies separated from each other by a respective flow directing tray, said apparatus being provided with a flow distributor formed and arranged for dividing said feed into at least a first feed stream and a second feed stream and directing said feed streams onto respective ones of first and second screen assemblies, and receiving filtrate from a respective screen assembly, from said respective flow directing tray(s).

With an apparatus of the present invention, the size of apparatus required to process a given volume of feed is substantially reduced compared with conventional apparatus, since a substantially increased effective screen surface area can be accommodated with relatively little or no increase in the size of the apparatus by means of stacking a plurality of screen assemblies within a single basket and using a flow distributor to route multiple flows in parallel through different screens in the stack.

Advantageously the distributor is formed and arranged so as to be switchable between a plurality of different flow directing configurations. Conveniently said plurality of flow directing configurations includes an intensive screening configuration in which the whole of the feed is directed onto said first screen assembly and the whole of the filtrate from said first screen assembly is directed onto said second screen assembly. Alternatively or additionally there is provided a restricted feed capacity configuration in which the whole of the feed is directed onto only one of said first and second screen assemblies, and the filtrate therefrom exhausted directly from the apparatus without passing through the other one said first and second screen assemblies. Such a configuration is useful for basic fluid processing where high efficiency or high volume processing are not required and a reduced number of screens in operation reduces operating cost for screens consumed.

Advantageously the mesh sizes of the various screens are selected to suit the particular distributor configuration being employed and/or the loading of the mixture (% solids content), the particle size of the solids, and/or the particle size distribution of the solids. Thus for example in a configuration where the feed is divided into one portion passing through the first screen and not the second, and another portion passing through the second screen and not the first, the first and second screens would normally have the same mesh size. On the other hand in a configuration where the whole of the feed is passed successively through both the first and second screens, then the second screen would normally have a finer mesh size than the first screen.

In general the distributor will comprise a plurality of passages provided with valves, typically flap valves, sleeve valves or plug valves, or closure plates etc, for selective opening or closing of different passages. The distributor may be mounted in either the static housing or on the floating basket. It is also possible, in principle, for part of the distributor to be mounted in the static housing and part on the floating basket. Where a greater or lesser part of the distributor is mounted in the static housing, then the distributor is generally provided with flexible conduit portions defining at least part of the passages, for coupling the passages from the static housing to the floating basket.

The passages of the distributor may be defined in various different ways. Conveniently they are defined by walls extending downwardly inside a downwardly extending chamber so as to provide a lateral subdivision of the chamber into individual passages providing predetermined proportions of the distributor flow capacity. Thus, for example, the distributor may be formed and arranged with one or more first flow passages for transmitting said first feed stream, and one or more second flow passages for transmitting said second feed stream.

It is generally preferred that vibratory screen apparatus should have a plurality of screen assembly stages with decreasing mesh size, i.e. meshes of successively finer cut. It will accordingly be appreciated that in addition to having first and second screen assemblies, with similar mesh size, formed and arranged for intercepting said first and second feed streams respectively, the vibratory basket may also have one or more further screen assemblies with different mesh size upstream and/or downstream of said first and second screen assemblies. Conveniently there is provided upstream of first and second screen assemblies, an initial, coarser mesh size, screen assembly and the vibratory screening apparatus is formed and arranged so that substantially the whole of the liquid and solids mixture feed is directed through said initial screen assembly, before being divided into said at least first and second feed streams. In such cases there would generally be used an initial screen assembly with a mesh size of around 10 to 80 (wires per inch), for example, about 20, and the first and second screen assemblies would have a mesh size of around 40 to 325, conveniently 100 to 250 for example about 200. In yet another possible distributor configuration which could also be provided, the feed is passed only through the initial coarse screen.

It will also be appreciated that, whilst in accordance with normal practice, all of the separated out solids are disposed of in one way or another, in certain cases it is advantageous to retain within the recycled drilling mud fluid, some solids within a particular size range. Typically these may comprise one or more of sized salt, sized calcium carbonate, and other suitable solids, which are selected to be of a size compatible with minimising formation damage during drilling of a specific formation such as an oil reservoir or a zone where fluid can be lost to the formation. In this instance solids above a specified size can be removed with a top screen and rejected, while solids of a smaller size but greater than a second size, can be separated with the second screen and subsequently returned to the drilling fluid mud system, with solids smaller than those removed by the second screen but larger than a third size, may be removed with a third screen and rejected. In other cases it may be desirable to return only the largest size particle fraction separated out at the first screen, for return to the drilling fluid where this is used in formations with particularly large pore size.

Various screen assemblies and screen mounting systems may be used in the apparatus and baskets of the present invention, including, for example, those described in our earlier patent publication WO 03/013690.

The floating basket may be mounted in any convenient manner known in the art. Typically there is used a resilient mounting such as a coil spring or rubber block mounting, and the basket vibrated with an eccentrically rotating weight drive. Other forms of resilient mounting may be more convenient with other forms of drive, for example, a leaf spring mounting, with the basket being vibrated with an electromagnetic displacement drive being used to displace the basket against the return force of the spring mounting.

In a further aspect the present invention provides a basket suitable for use in a vibratory screening apparatus, said basket mounting a stack of screen assemblies, with superposed screen assemblies separated from each other by a respective flow directing tray, and being provided with a flow distributor formed and arranged for dividing said feed into at least a first feed stream and a second feed stream and directing said feed streams onto respective ones of first and second screen assemblies, and receiving filtrate from a respective screen assembly, from said respective flow directing tray(s).

In another aspect the present invention provides a vibratory screening apparatus for use in removing solids from a liquid and solids mixture feed, said apparatus comprising a static outer housing, at least one floating basket mounted so as to be vibratable, in use of the apparatus, by a vibrator device formed and arranged for vibrating said basket, said basket mounting a stack of screen assemblies separated by flow directing trays, said apparatus being provided with a flow distributor formed and arranged for dividing said feed into at least a first feed stream and a second feed stream and directing said feed streams onto respective ones of first and second screen assemblies, and receiving from respective flow directing trays, respective filtrates from said respective screen assemblies.

In a yet further aspect the present invention provides a basket suitable for use in a vibratory screening apparatus, said basket mounting a stack of screen assemblies separated by flow directing trays, and being provided with a flow distributor formed and arranged for dividing said feed into at least a first feed stream and a second feed stream and directing said feed streams onto respective ones of first and second screen assemblies, and receiving from respective flow directing trays, respective filtrates from said respective screen assemblies.

BRIEF DESCRIPTION OF THE DRAWINGS

Further preferred features and advantages of the invention will appear from the following detailed description given by way of example of preferred embodiments illustrated with reference to the accompanying drawings in which:

FIG. 1 shows schematically one embodiment of a vibratory screen apparatus 1 of the invention with an outer housing (indicated schematically) 2, in which is mounted on springs 3, a basket 4. (See below for more detailed description of housing.) The basket is generally box shaped with pairs of circumferentially extending inwardly projecting flanges 5 height on the basket side walls 6, for supporting respective ones of a stack 7 of screen assemblies 8 separated by flow directing trays 9. A vibrator unit 10 is secured to the top 11 of the basket. (Alternatively, the vibrator 10 could be mounted on a side of the basket 4, or incorporated into or within the structure of the basket 4. The interior 12 of the basket 4 is divided into a series of levels 13 between neighbouring screen assemblies 8 and flow directing trays 9.

FIGS. 2A/B to 4A/B show schematically a distributor 15 provided at one end 16 of the floating basket 4. The distributor 15 is formed and arranged into inside and outside passages 17, 18 shown in FIGS. 2A to 4A, and 2B to 4B, respectively, for connecting with the various levels 13 of the interior 12 of the basket 4 via openings 19 controlled by flap valves 20. In some cases the flap valves 20 are additionally used to control openings 21 along the length of the passages 17, 18 in certain positions of said flap valves 20, as further described hereinbelow.

FIGS. 2A/B, 3A/B and 4A/B show different configurations of the distributor 15 for providing different feed flow arrangements through the screen assemblies 8, which are indicated as A, B and C, respectively, in FIGS. 2 to 5.

DETAILED DESCRIPTION OF THE PREFERRED EMBODIMENTS

Figure 2A:
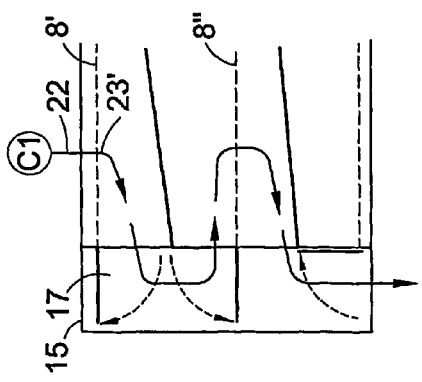
FIGS. 2A to 4B are schematic vertical sections illustrating different flow paths through the stacked screens with different configurations of the flow distributor set up for parallel and series operation.
Figure 2B:
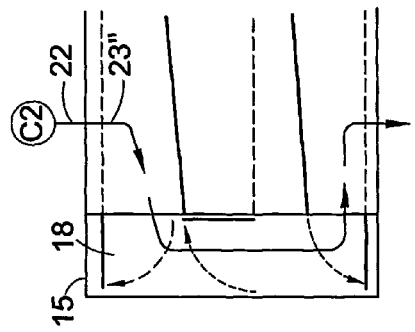

In more detail FIG. 2A shows the inside passage 17 and interior 12 of the basket 14, with an upper flap valve 20' raised to open an upper connecting opening 19' connecting the passage 17 and first level $13^1$ above the upper flow deflector tray 9'. An intermediate flap valve 20" is raised to close an intermediate connecting opening 19" connecting the passage 17 and second level $13^2$ between the upper and lower flow deflector trays 9', 9" whilst simultaneously opening an intermediate level opening 21' in passage 17. A lower flap valve 20'" is lowered to open a lower connecting opening 19'" connecting the passage 17 and a fourth level 134 below the lower flow deflector tray 9". In this configuration it may be seen that a feed 22 of liquid and solids is passed through a coarse mesh, (typically mesh size 20) upper screen 8' and the filtrate 23 passed along the upper flow deflector tray 9' into passage 17 and thence, bypassing a first, mid-level, screen 8", onto a second, low-level, screen 8'". In this configuration the whole of the feed 22 is passed through the coarse screen 8' and only one of the first and second screens 8", 8'''.

Figure 3A:
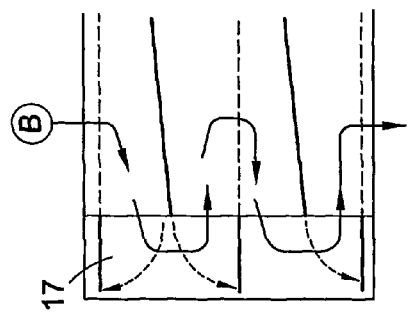
Figure 3B:
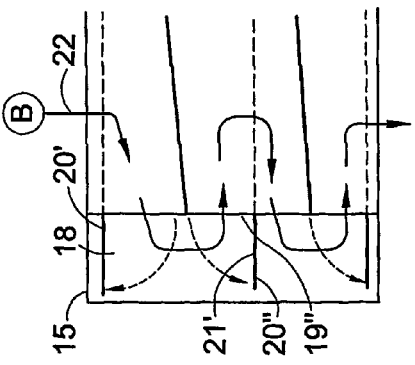

FIG. 3B shows the distributor 15 configured so that the upper flap valve 20' is raised to open the upper connecting opening 19', the intermediate flap valve 20" is lowered to open the intermediate connecting opening 19" whilst simultaneously closing the intermediate level passage opening 21', and the lower flap 20''' is lowered to open the lower connecting opening 19''' whilst closing a bottom passage opening 21" as before. In this configuration the whole of the feed 22 is passed through the coarse screen 8' and then successively through each of the first and second screens 8", 8''' thereby providing a more progressively finer screening of the feed (by using a finer mesh size in the second screen than in the first screen).

Figure 4A:
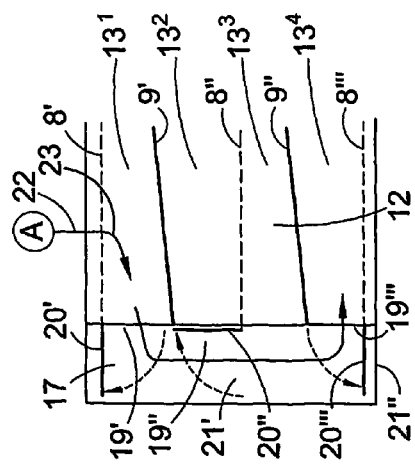
Figure 4B:
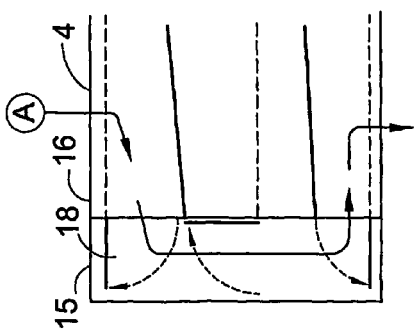

FIG. 4A shows the distributor in the inside passage 17 configured so that the upper flap valve 20' is raised as before. The intermediate flap valve 20" is lowered so as to open the intermediate connecting opening 19" whilst simultaneously closing the intermediate level passage opening 21' and the lower flap 20''' is raised to close the lower connecting opening 19''' whilst opening the bottom passage opening 21'''. In this configuration of the inside passage 17 in the distributor 15, that part 23' of the filtrate 23 from the coarse screen 8' passing into the inside passage 17, is directed onto the first screen 8" and then out of the bottom opening 21" of the inside passage 17, by-passing the second screen 8'''. The outside passage 18 is configured as in FIG. 2A so that the remaining part 23" of the filtrate 23 from the coarse screen 8' passing into the outside passage 18, is directed onto the second screen 8''' by-passing the first screen 8". It will be appreciated that in this configuration of the distributor 15, the screen area available for screening of the feed 22 is effectively double that used in FIG. 2A/B and that available in a conventional vibratory screening apparatus basket of similar footprint.

Figure 5A:
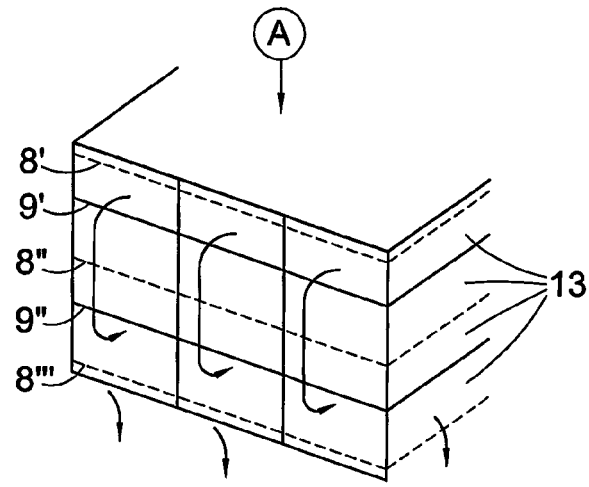
FIGS. 5A-C are schematic perspective end views of the basket of the apparatus also illustrating the flow paths in various different configurations of the flow distributor.
Figure 5B:
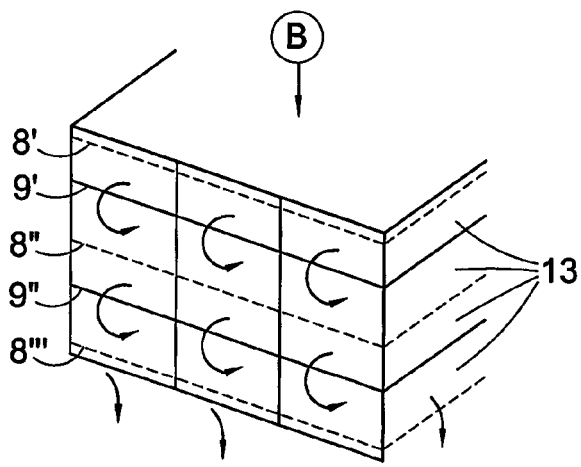
Figure 5C:
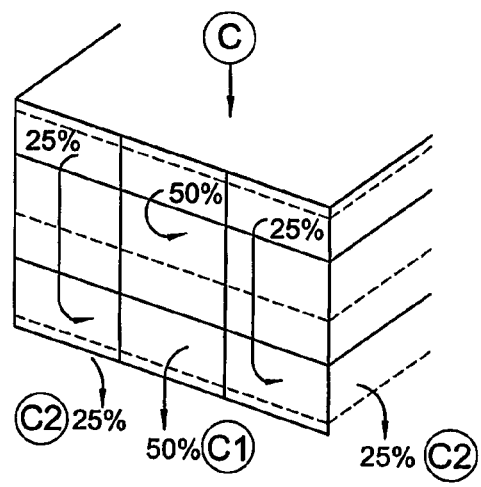

FIGS. 5A-C are schematic perspective views of the end 16 of the basket 4 to which the distributor 15 is coupled but with the distributor 15 substantially removed for clarity, showing the flows in and out of the various openings 19 connecting the distributor 15 to the interior 12 of the basket 4.

Figure 1:
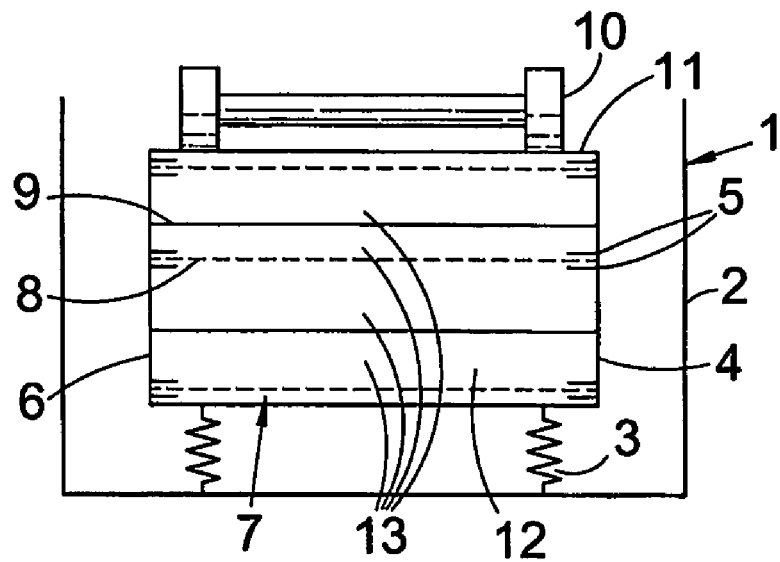
FIG. 1 is a schematic sectional elevation of a vibratory screening apparatus of the present invention.
Figure 6:
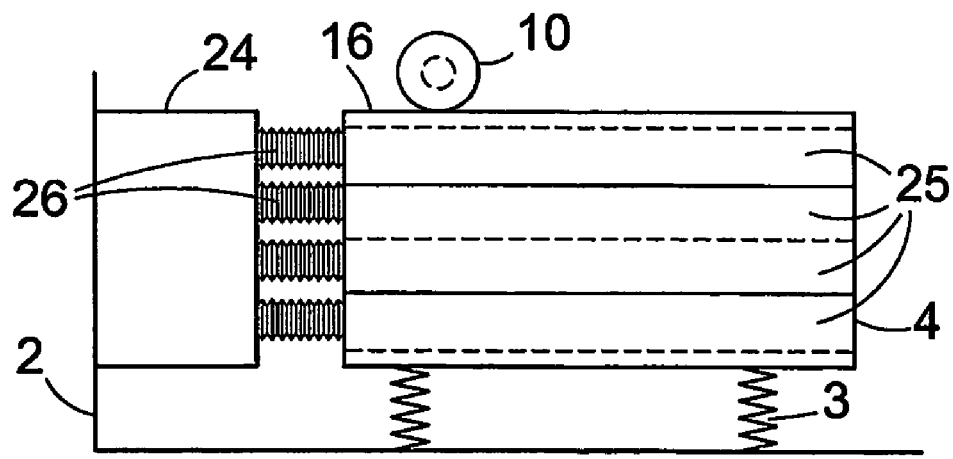
FIG. 6 is a side elevation of a modified apparatus with a static flow distributor connected to a floating vibratory apparatus.

FIG. 6 shows schematically another embodiment in which there is used a distributor 24 mounted on the static housing 2 and with its connecting openings 19 coupled to the corresponding levels 25 inside the floating basket 4 by flexible conduits 26.

Figure 7:
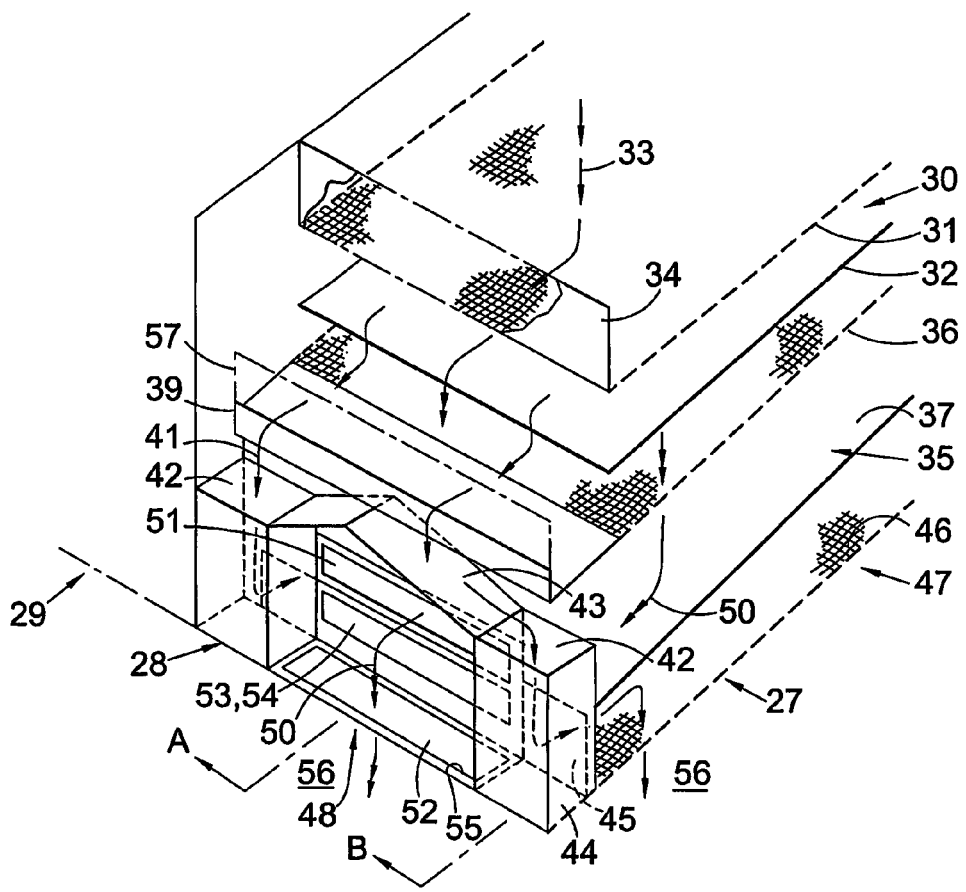
FIG. 7 is a partly cut-away schematic perspective view of a further embodiment showing one module of a twin-module apparatus set up for parallel operation.

FIG. 7 shows a further embodiment of a screening apparatus 27 of the invention which has identical twin modules 28, 29 (only one shown in detail). Each module has a first, coarse mesh, upper, scalping, deck 30 with a first, coarse mesh, screen 31 above a flow back tray 32. Fluid 33 to be screened is retained on the screen 31 by an end wall 34.

Below the first deck tray 32 is disposed a second deck 35 comprising a second screen 36 above a respective flowback tray 37. A certain amount of fluid 38 is retained on the second screen 36 by a weir 39 provided at the lower end 40 thereof. When the flow rate of the feed of fluid 33 to be screened, exceeds the capacity of the second screen, part 41 of the fluid 38 overflows the weir 39 either directly into one or other of two vertically extending conduits 42 at opposite sides of the module 28, or onto one or other of two sloping deflector plates 43 which divert it into a respective one of the conduit 42, as shown by the single headed fluid flow arrows in FIGS. 7-8.

Figure 8A:
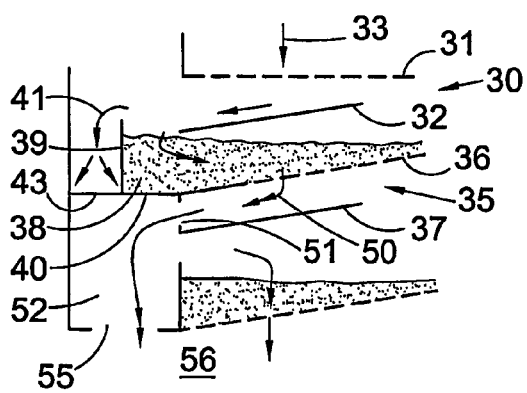
FIGS. 8A and 8B are vertical sections of the apparatus of FIG. 7 at A and B.

At the bottom 44 of the vertical conduits 42 are provided rearwardly facing openings 45 through which the diverted fluid 41 is directed onto the screen 46 of a third deck 47 disposed below the second deck 35. Thus this part 41 of the fluid flow 33 passes through the first deck screen 31 and the third deck screen 46, by-passing the second deck screen 36 (see also FIGS. 8A and 8B, in which FIG. 8A is a section through a central vertical plane at A, which extends through a central portion 48 of the module 28, with the deflector plates 43; and FIG. 8B is a vertical section through one of the vertically extending side conduits 42).

Figure 8B:
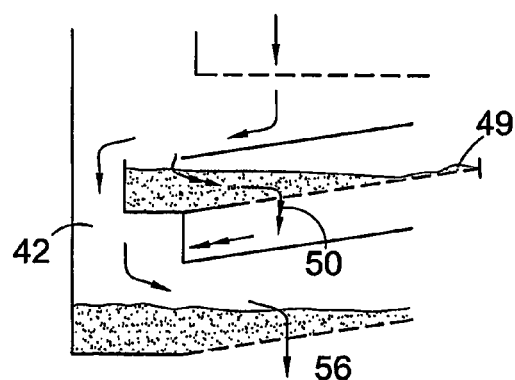

That part 38 of the fluid 33 retained on the second screen 36 is passed through the second deck screen 36 (the solid particulate material 49 retained thereon being "walked up" the screen 36 in the usual way—see FIG. 8B), as indicated by the double headed arrows 50. This part 50 of the fluid flow 33, is then passed through a second deck end wall opening 51 and down a central vertically extending conduit 52 underneath the deflector plates 43. A closure panel 53 seals a third deck end wall opening 54, below the second deck end wall opening 51, thereby preventing this part 50 of the fluid flow 33 from entering the third deck 47. A bottom opening 55 in the central vertical conduit 52 allows this fluid flow 50 to pass into the sump 56 of the apparatus 28 where it rejoins the other part 38 of the fluid flow 33, the respective parts 41 and 38, 50 of the fluid flow 33, being passed through the first deck screen 31 and then, in parallel, through a respective one of the second and third deck screens 36, 46.

Figure 9:
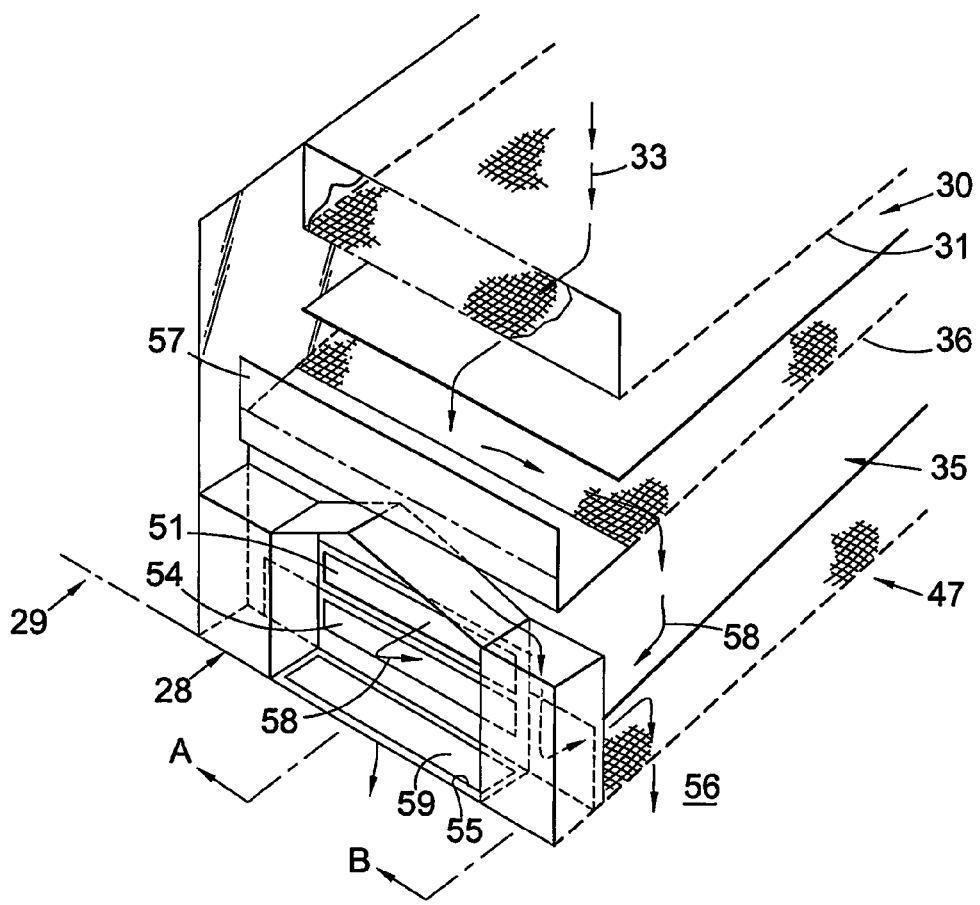
FIGS. 9-10 are corresponding views of the apparatus of FIGS. 7-8, set up for series operation.
Figure 10A:
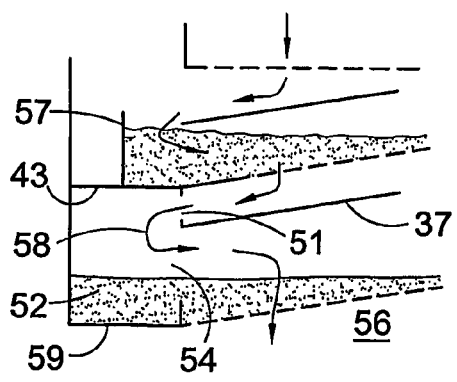
Figure 10B:
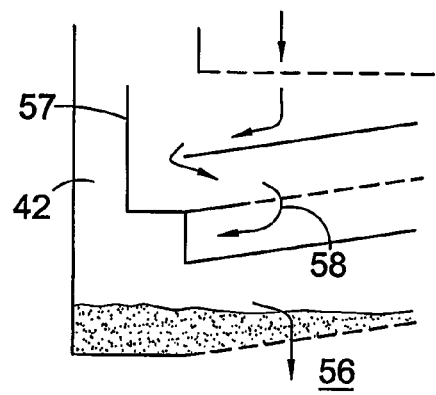

The module 28 as described above, may be readily reconfigured for serial operation whereby the whole of the fluid is passes through each one of the first, second and third deck screens, 31, 36, 46, as shown in FIGS. 9-10. In more detail the weir 39 is replaced by a high wall 57 which ensures that the whole of the fluid flow 33 is passed through the second deck screen 36. As before, the fluid flow 58 then passes out through the second deck end wall opening 51 into the central vertical conduit 52. In this configuration, the bottom opening 55 is sealed by a closure plate 59 whilst the closure panel 53 of the third deck end wall opening 54 is opened so that the fluid flow 58 is routed from the central vertical conduit 52 into the third deck 47 and passed through the screen 46 thereof into the sump 56.

Each of the first and second modules 28, 29, would normally be configured in the same way, but if desired they could be configured differently i.e. one for parallel (2 screen) operation and one for series (3 screen) operation. Also single screen operation is possible when required, by removing one or two screens from the or each module—depending on the configuration of the modules and the fluid feed arrangement. In addition the fluid feed to the apparatus can be arranged to be directed to either or both of the modules (see also further discussion hereinbelow with reference to FIG. 13). With the significantly increased fluid processing capacity of the apparatus (in parallel mode) it will be appreciated that occasions will arise when the fluid feed is insufficient to maintain a high fluid level and short beach length on the screens, which can result in drying of the particulate solids on the beach portion of the screen and damage to the screens therefrom, and/or reduced efficiency of transportation of the particulate solids up the beach for discharge from the screen. In such circumstances damage to the screens can be minimized by restricting the fluid feed to only one of the twin modules.

A particular advantage of this type of embodiment is that, in its parallel configuration, a more even and controlled distribution of the fluid flow across the width of the module is obtained, thereby providing a more efficient screening. Another significant advantage is a significantly increased fluid screening capacity—which can approach almost 100% greater than with conventional screening apparatus of the same footprint.

It will also be appreciated that various parameters of the modules may be made further configurable. Thus, for example, the weir height could be configurable for a series of different heights. Also the relative proportions of the central and side, vertical conduits could be selected to accommodate particular desired flow capacity proportions for the different fluid flow parts in parallel mode operation.

It will further be appreciated that various modifications may be made to the above embodiments without departing from the scope of the present invention. Thus, for example, in place of a flow distributor system based on the use of closure plates and/or flap valves, there could be used one based on proportional valves and the like.

Figure 11:
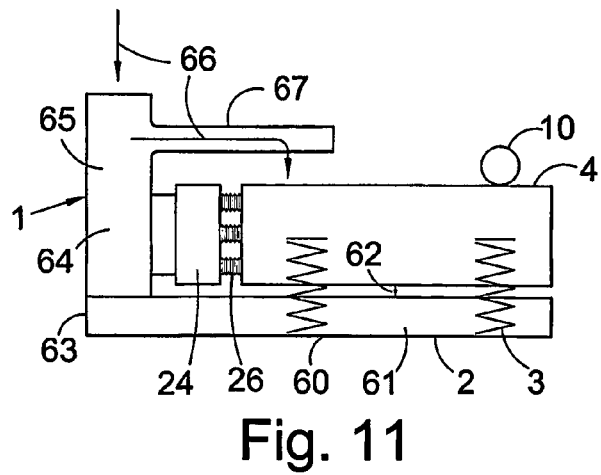
FIGS. 11-12 are schematic general side elevations of vibratory screen apparatus of the invention showing the housing.
Figure 12:
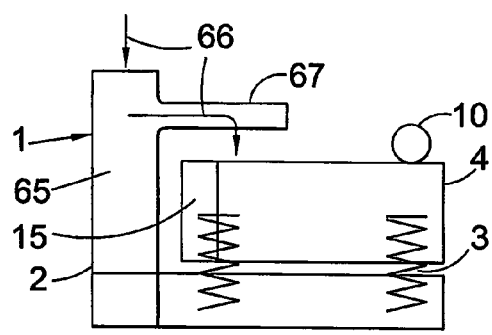
Figure 13:
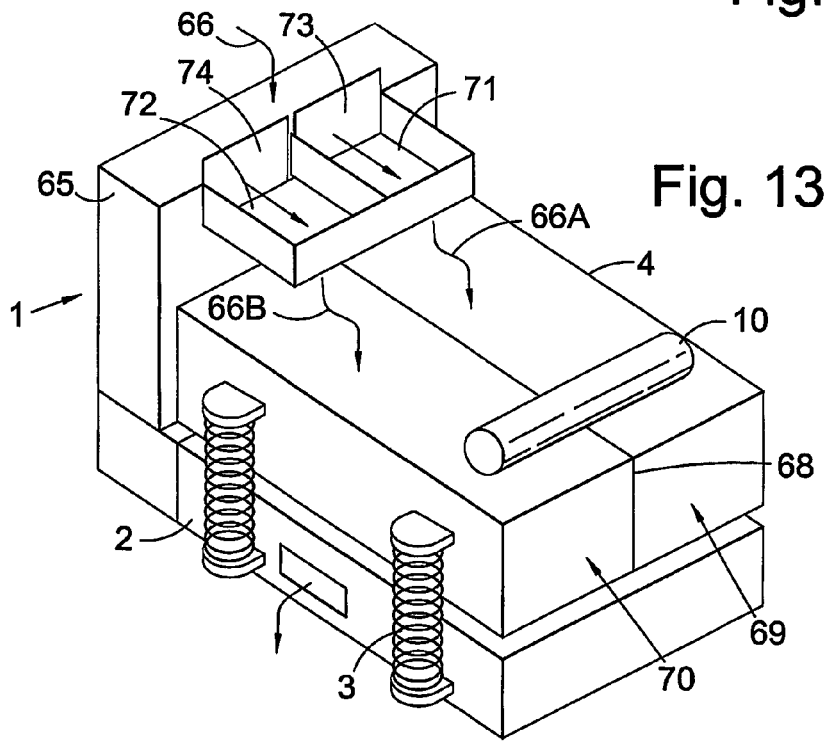
FIG. 13 is a schematic perspective view of the apparatus of FIG. 12.

FIGS. 11 to 13 show a vibratory screening apparatus 1 of the invention with a generally conventional form of static outer housing 2, in which is mounted on springs 3, and a basket 4 with a vibrator device 10. In more detail the static housing 2 has a base support 60 which includes a sump 61 for receiving filtrate 62 from the basket 4, and a feed device support portion 63 mounting a feed device 64. The feed device 64 comprises a header tank 65 for receiving a liquid and solids mixture feed 66, and having a feed chute 67 extending out therefrom above the basket 4 so as to pass said feed 66 into the basket 4. In the case of FIG. 11, there is provided a static flow distributor 24 mounted on the header tank portion 65 of the static housing 2, and coupled to the floating basket 4 via flexible conduits 26. In the case of FIGS. 12 and 13, the flow distributor 15 is incorporated in the floating basket 4.

In the apparatus shown in FIG. 13 it may be seen that the basket 4 has a lateral divider 68 separating the basket into two independently operable basket feed processing modules 69,70, and the (common) housing 2 has two separate feed chutes 71,72 extending from the header tank 65 and formed and arranged for directing said liquid and solids mixture feed 66A, 66B to respective ones of said basket feed processing modules 69,70. The chutes 71,72 are provided with respective control gates 73,74 for controlling supply of feed 66 from the header tank 65, so that the user has the option of using only one or other, or both, of the modules 69,70, when required—as discussed hereinbefore.

The invention claimed is:

1. A basket suitable for use in a vibratory screening apparatus, for use in removing solids from a liquid and solids mixture feed, said basket mounting a stack of at least three superposed screen assemblies, with superposed screen assemblies being separated from each other by a respective flow directing tray, said stack of at least three screen assemblies being provided with a flow distributor formed and arranged so as to be switchable between a plurality of different flow directing configurations, including:
    a) a parallel processing configuration in which said flow distributor receives filtrate from a primary upper screen assembly and divides said filtrate into at least a first feed stream and a second feed stream and directs said feed streams onto respective remaining first and second ones of said stack of screen assemblies, and receives filtrate from a respective remaining screen assembly, from said respective flow directing tray(s); and
    b) an intensive screening configuration in which the whole of the filtrate from a primary upper screen assembly is directed onto a first remaining screen assembly and the whole of the filtrate from said first remaining screen assembly is directed onto a second remaining screen assembly;
    wherein the flow distributor is downstream of the primary upper screen assembly and when set for parallel or series operation distributes the filtrate from the primary upper screen to the remaining first and second screen assemblies.

2. A vibratory screening apparatus for use in removing solids from a liquid and solids mixture feed, said apparatus comprising a basket according to claim 1, and further comprising a static outer housing, said housing comprising: a base support formed and arranged for mounting at least one said basket in floating manner so as to be vibratable, in use of the apparatus, by a vibrator device formed and arranged for vibrating said basket, said base support having a sump for receiving filtrate from said basket, and said housing having a feed device formed and arranged for directing said liquid and solids mixture feed to said basket mounted in said base support.

3. A basket as claimed in claim 1 wherein said plurality of flow directing configurations includes a restricted feed capacity configuration in which the whole of the feed is directed onto only one of said first and second remaining screen assemblies, and the filtrate therefrom exhausted directly from the apparatus without passing through the other one of said first and second remaining screen assemblies.

4. A basket as claimed in claim 1 wherein at least said primary screen assembly has a different mesh size from at least one of said remaining screen assemblies.

5. A basket as claimed in claim 1 wherein said first and second remaining screen assemblies have the same mesh size.

6. A basket as claimed in claim 1 wherein said flow distributor defines a plurality of flow pathways provided with flow control devices, for selective opening or at least partial closing of different passages.

7. A basket as claimed in claim 6 wherein at least one said flow control device is selected from the group consisting essentially of: flap valves, sleeve valves, plug valves, and closure plates.

8. A basket as claimed in claim 6 wherein at least one said flow control device comprises by a weir, formed and arranged for sub-dividing said feed into said first feed stream passing over said weir and a said second feed stream not passing over said weir.

9. A basket as claimed in claim 8 wherein said weir comprises a variable height weir.

10. A basket as claimed in claim 6 wherein said flow distributor includes at least one wall formed and arranged for defining a plurality of laterally adjacent flow pathways.

11. A basket as claimed in claim 1 wherein the flow distributor is mounted on the basket.

12. A basket as claimed in claim 1 wherein the flow distributor is coupled to the basket by flexible conduits.

13. A vibratory screening apparatus as claimed in claim 2, wherein said basket forms part of a multi-basket assembly comprising a plurality of said baskets, mounted in said static housing, and wherein said housing has a feed distribution device formed and arranged for directing said liquid and solids mixture feed to at least one of said plurality of baskets.

14. A vibratory screening apparatus basket as claimed in claim 2, wherein said basket further includes a lateral divider defining independent feed processing modules, and wherein said housing has a feed distribution device formed and arranged for directing said liquid and solids mixture feed to at least one of said basket feed processing modules.

15. A basket as claimed in claim 1 wherein said flow directing trays are formed and arranged so that substantially the whole of the filtrate from a screen assembly directly above said flow directing tray can be intercepted thereby, whereby said feed can be substantially fully divided into parallel first and second feed streams to respective ones of first and second remaining screen assemblies.

* * * * *